United States Patent Office 3,454,244
Patented July 8, 1969

3,454,244
AIRCRAFT ARRESTING DEVICE
Karl Ove Torgney Wålander, Elsa Brandstrom gata 5, Linkoping, Sweden
Filed Mar. 10, 1967, Ser. No. 622,205
Claims priority, application Sweden, Apr. 15, 1966, 5,135/66
Int. Cl. B64c 25/68; B64f 1/02
U.S. Cl. 244—110                          10 Claims

ABSTRACT OF THE DISCLOSURE

An aircraft arresting net consisting of spaced upper and lower cables, at least one of which is composed of a plurality of strands, said cables being joined by a plurality of vertical cables, each of the vertical cables being divided at one or both of its ends into separate lines constituting harness units which connect to the strands in one or both of the upper and lower cables. The harness units may be connected stationarily to the upper and/or lower cables or movably connected thereto.

---

Figure 1:
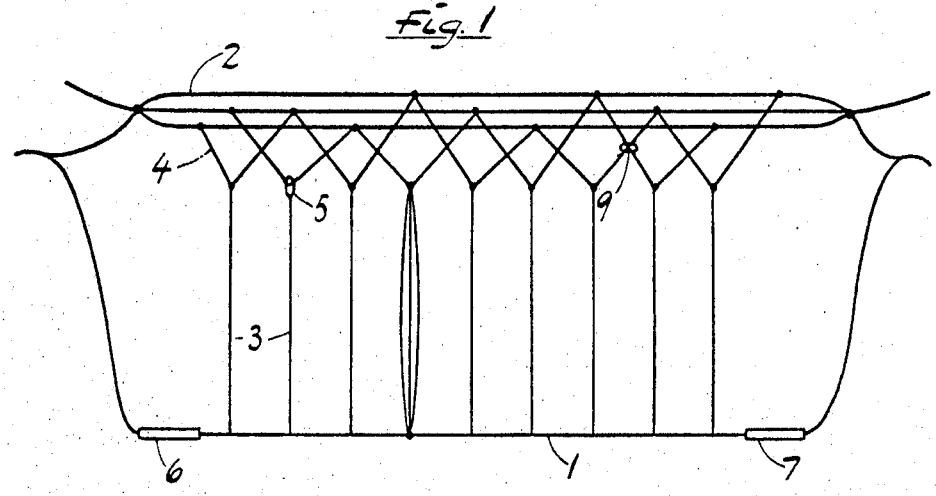

This invention relates to arresting devices for aircraft by means of a net arrangement and it is an object of the invention to provide an arrangement by means of which the disadvantages of presently-known devices will be eliminated and an exceptionally sturdy and effective device will result.

It is known to arrest the movement of aircraft, which for one reason or another cannot stop in the landing space available, by means of nets which are attached at both ends to braking devices capable of halting the aircraft within a comparatively short distance.

There are primarily two types of nets, one being a simple net having horizontal upper and lower cables or ropes which are connected by so-called vertical ropes which wrap themselves around the leading edge of the wings of the aircraft when arresting its movement. Nets of this type are strong and sturdy and can be used several times. They can also be used in conjunction with arrester hooks so that aircraft which are provided with landing hooks, as well as those without hooks can be stopped by the same net.

A second type of net is that which is the so-called "compound" net and which is composed of a plurality of nets disposed parallel to one another, each of such nets having only one or perhaps a few vertical ropes acting upon the aircraft, a plurality of the nets having laterally disposed vertical ropes arresting the aircraft at the same time.

The nets above described are relatively complicated and considerable time is needed to re-set them after they have been used. However, they provide for a good distribution of load around the aircraft. The first-mentioned type of net provides a relatively concentrated load on the upper surface of the aircraft and sometimes also over its lower surface, whereas the compound net causes the load to be distributed over a wider area, which is an important advantage due to the fact that the upper surface of the aircraft fuselage of the airplane is often relatively delicate, and this even in the case of the solidly-built military aircraft, and usually the crew is located within this area. Also the compound net cannot be used for arresting aircraft by means of an arrester hook, so that as a result the use of such nets is considerably restricted.

The present invention relates to an arrester gear for aircraft, comprising nets which include substantially horizontal upper and lower lines or cables arranged when in raised position, in vertical spaced relationship and joined together by vertical cables or lines.

The invention is mainly characterized in that each vertical line or cable or group of lines or cables is connected with at least two upper and/or lower lines. In this manner, a net is obtained which substantially possesses all of the advantages of the types of nets herein described, but without the disadvantages thereof. The improved net is of a relatively simple and sturdy construction and provides for a good distribution of load around the fuselage of the aircraft. Since the net may be constructed with only one lower line or cable it can also be used as an arrester wire when an aircraft uses its arrester hook.

The invention is disclosed in the accompanying drawing wherein

FIG. 1 shows a front elevational view of a net constructed according to the invention, and FIGS. 2 to 6 show portions of nets according to other embodiments.

In FIG. 1 is shown a lower line or cable 1; three parallel upper lines 2 and vertical lines 3 which unite the horizontal lines 1 and 2. The top of each vertical line 3 is connected to two of the upper lines 2 by means of two diverging lines arranged to form a V and which together form a harness unit 4. The connection between the harness unit and the vertical line may be stationary or movable, for example by slidably arranging the harness units in an eyelet or ring 5 on the vertical line. Elastic or extensible members are shown at 6 and 7. The upper and lower lines are connected to brake systems (not shown) in the known manner.

Figure 2:
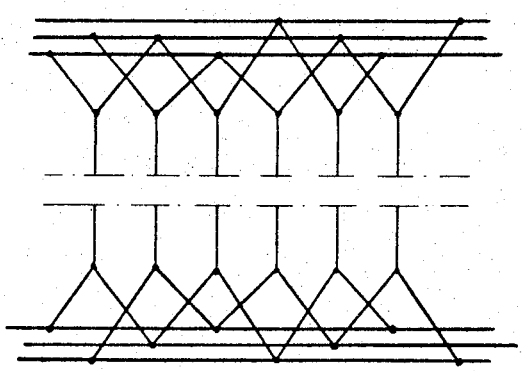

In FIG. 2 is shown a net having a plurality of lower lines 1 and upper lines 2 and also vertical lines 3 provided at both ends with the harness units 4 for connecting the vertical lines to the upper and lower lines.

Figure 3:
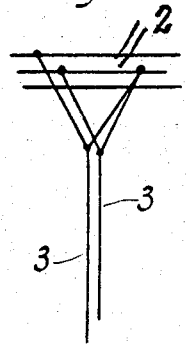
Figure 4:
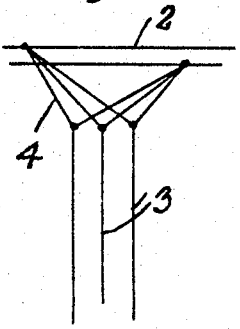
Figure 5:
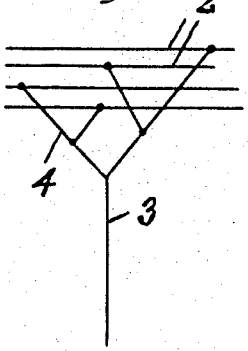
Figure 6:
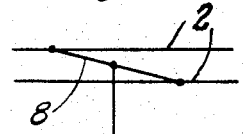

FIGS. 3 and 4 show groups of vertical lines 3 connected to the harness units 4. FIG. 5 shows an example of the harness unit 4 connected to several horizontal lines or cables and FIG. 6 shows a harness unit in the form of a straight line 8. Intersecting harness units may be isolated from each other, and securely connected to each other at their point of intersection, or they can be movably connected by means of a ring 9 surrounding the harness units as shown in FIG. 1. As can also be seen in FIG. 1 a vertical line may also be connected to each harness unit.

The harness units as shown in the drawing are of V-shape but the invention contemplates an arrangement in which the angle between the harness units is made approximately equal to zero. Although not illustrated in the drawing, the upper and lower lines or cables are each connected together by a band or the like, which breaks when the aircraft strikes the net. Consequently, equivalent bands can be used in the net instead of lines. The elasticity of the material from which the lines and bands are made may vary in accordance with different requirements.

What is claimed is:

1. An arresting device for aircraft comprising, a net having substantially horizontal upper and lower lines, one of the lines being composed of a plurality of separate strands, the horizontal lines being arranged when the net is in a raised position, in spaced vertical position and being joined together by vertical lines, the vetrical lines being divided at one end into at least two line sections constituting harness units, which line sections are each connected at one end to the separate strands of one of the horizontal lines.

2. An arrangement according to claim 1, in which the second horizontal line is also composed of separated strands and the second end of each vertical line is divided into separate line sections which are attached to the separated strands of the second horizontal line.

3. An arrangement according to claim 1, wherein the line sections extend divergently from their points of connection to the vertical lines, the line sections having their outer ends joined to the separate strands of the horizontal line at relatively widely spaced intervals.

4. An arrangement as claimed in claim 3, in which the harness units are substantially V-shaped.

5. An arrangement as claimed in claim 3, wherein the connection between each of the vertical lines and the line sections is stationary.

6. An arrangement as claimed in claim 3, wherein the connection between each of the vertical lines and the harness units is capable of moving along the harness unit.

7. An arrangement as claimed in claim 3, wherein each harness unit is composed of diverging line sections, joining several vertical lines and the horizontal lines.

8. An arrangement as claimed in claim 3, wherein the vertical lines are connected with the harness units in groups the harness units having their ends spaced at approximately equal intervals.

9. An arrangement as claimed in claim 1, wherein the harness units are suspended from different vertical lines and arranged so that they intersect each other.

10. An arrangement as claimed in claim 9, wherein the harness units are securely connected to each other at the points of intersection and are capable of moving by means of a ring surrounding the harness unit.

References Cited

UNITED STATES PATENTS

| | | | |
|---|---|---|---|
| 3,069,118 | 12/1962 | Bernard | 244—110 |
| 3,089,673 | 5/1963 | Fonden et al. | 244—110 |
| 3,212,736 | 10/1965 | Fonden et al. | 244—110 |

FOREIGN PATENTS

| | | |
|---|---|---|
| 1,193,078 | 4/1959 | France. |

MILTON BUCHLER, *Primary Examiner.*

PAUL E. SAUBERER, *Assistant Examiner.*